United States Patent Office 3,632,580
Patented Jan. 4, 1972

3,632,580
MORPHINE-3-(N-SUBSTITUTED-CARBAMOYL METHYL)ETHERS
Don Pierre Rene Lucien Giudicelli, Fontenay-sous-Bois, and Henry Najer, Paris, France, assignors to Les Laboratoires Dausse, Paris, France
No Drawing. Filed May 17, 1968, Ser. No. 729,923
Claims priority, application France, May 26, 1967, 108,086
Int. Cl. C07d 87/40
U.S. Cl. 260—247.5                    5 Claims

ABSTRACT OF THE DISCLOSURE

The invention provides new derivatives of morphine of low toxicity and analgesic effect but pronounced antitussive effect in which the 3-position hydroxyl group has been replaced by a group of formula:

where $R^1$ and $R^2$ are hydrogen, lower alkyl, or together form a heterocyclic ring, not both being hydrogen.

---

This invention provides, as new compounds, the morphine derivatives of the formula:

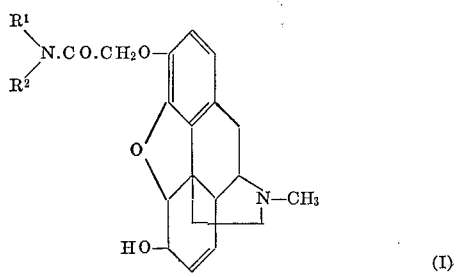

and their pharmaceutically acceptable acid addition salts, in which one of $R^1$ and $R^2$ is lower alkyl and the other is hydrogen or lower alkyl, or $R^1$ and $R^2$ together with the adjacent nitrogen form a saturated mononuclear heterocyclic ring which may contain an oxygen atom, e.g. a piperidine, morpholine, or pyrrolidine ring. By "lower alkyl" is meant alkyl of 1 to 4 carbon atoms.

In the following the residue of the morphine molecule is represented by M, so that, e.g. the compounds of Formula I may be written

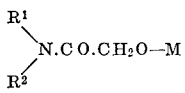

for brevity.

According to a feature of the invention, the compounds of Formula I are made by reacting morphine with a compound of the formula:

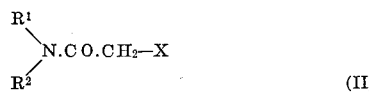

where X is halogen, especially chlorine or bromine, and $R^1$ and $R^2$ are as hereinbefore defined. The reaction is preferably carried out in an alcohol, such as ethanol, and in the presence of an alkaline hydrohalic acid acceptor such as sodium ethoxide, the reaction being carried out by heating the mixture for a few hours at the reflux temperature of the alcohol used.

The compounds of Formula II are prepared in a known way, by the action of a halide of a 2-halogeno acetic acid, or of an alkyl 2-halogeno-acetate, on an amine of the formula:

where $R^1$ and $R^2$ are as hereinbefore defined.

In an alternative procedure in accordance with the invention, the compounds of Formula I are prepared by reacting a morphine derivative of the formula:

$$M—O—CH_2COX^1 \qquad (IV)$$

with an amine of the Formula III, where $X^1$ is halogen or lower alkoxy, and M is as hereinbefore defined.

The compounds of Formula IV in which $X^1$ is halogen may be made by reacting morphine with a halide of a 2-halogeno-acetic acid and the compounds in which $X^1$ is lower alkoxy may be made by reacting morphine with an alkyl 2-halogeno-acetate.

The salts of the compounds of Formula I are prepared by reacting in equivalent weights the chosen acid and base in accordance with known methods of preparation of mineral and organic acid addition salts.

The following examples illustrate the invention.

EXAMPLE 1

To a 250 ml. flask with three necks, fitted with a mechanical mixer, a dipping thermometer and a condenser surmounted with a calcium chloride guard tube 0.033 g. atom (0.75 g.) of metallic sodium in 75 ml. of absolute ethanol, 0.025 g. mol (7.5 g.) of morphine monohydrate, and 0.033 g. mol (3.5 g.) of N-methyl-2-chloro-acetamide are added successively. The reaction mixture is agitated for an hour at room temperature, heated for three hours at reflux temperature, and left overnight. The precipitated sodium chloride is removed by suction and washed with alcohol and the solvent of the filtrate is evaporated on a water-bath in vacuo. The residue is recrystallised twice from methyl ethyl ketone, and the morphine 3-(N-methylcarbamoylmethyl)ether is recovered as a white crystalline compound, soluble in water and alcohols, melting at 188–190° C.

Analysis. — Calcd. for $C_{20}H_{24}N_2O_4$ (percent): (M.W.=356). C, 67.40; H, 6.79; N, 7.86. Found (percent): C, 67.67; H, 7.01; N, 7.60.

EXAMPLE 2

In a 50 ml. flask with two necks, fitted with a mechanical mixer and a condenser surmounted with a calcium chloride guard tube, 0.013 g. atom. (0.3 g.) of metallic sodium is dissolved in 30 ml. of absolute ethanol, and 0.01 g. mol. (3 g.) of morphine monohydrate and 0.013 g. mol. (1.6 g.) of N,N-dimethyl-2-chloro-acetamide are added. The reaction mixture is agitated for an hour at room temperature, then heated for 3 hours at reflux temperature, and left overnight. The sodium chloride is removed by suction, and washed with alcohol and the solvent of the filtrate is evaporated on a water-bath in vacuo. The residue is recrystallised from 25 ml. of methyl ethyl ketone and morphine 3-(N,N-dimethyl-carbamoylmethyl)ether is recovered as a white hygroscopic crystalline substance, soluble in water and alcohols, melting at 140–142° C.

Analysis. — Calcd. for $C_{21}H_{26}N_2O_4$ (percent): (M.W.=370). C, 68.09; H, 7.07; N, 7.56. Found (percent): C, 68.66; H, 7.29; N, 7.29.

EXAMPLE 3

In a 50 ml. flask with two necks, fitted with a mechanical mixer and a condenser surmounted with a calcium chloride guard tube 0.01 g. atom (0.3 g.) of metallic sodium is dissolved in 30 ml. of absolute ethanol, and 0.01 g. mol (3 g.) of morphine monohydrate and 0.013 g. mol (2.1 g.) of monochloroacetic acid piperidide are added. The reaction mixture is agitated for an hour at room temperature, brought for 3 hours to reflux temperature and left overnight. The precipitated sodium chloride is removed by suction and washed with alchohol and the solvent of the filtrate is evaporated on a water-bath in vacuo. The residue is recrystallised from 15 ml. methyl ethyl ketone, and the morphine 3-(piperidinocarbonylmethyl)ether is recovered as a white crystalline compound, soluble in water and alcohols, melting at 136–138° C.

*Analysis.*—Calcd. for $C_{24}H_{30}N_2O_4$ (percent): (M.W. =410). C, 70.22; H, 7.36; N, 6.82. Found (percent): C, 70.01; H, 7.36; N, 6.65.

EXAMPLE 4

In a 250 ml. flask with two necks, fitted with a mechanical mixer and a condenser surmounted with a calcium chloride guard tube, 0.03 g. atom (0.7 g.) of metallic sodium is dissolved in 85 ml. of absolute ethanol, and 0.027 g. mol (8.2 g.) of morphine monohydrate and 0.03 g. mol (4.9 g.) of monochloracetic acid morpholide are added. The reaction mixture is agitated for an hour at room tempeature, brought for 3 hours to reflux temperature and left overnight. The precipitated sodium chloride is removed by suction, and washed in alcohol and the solvent is evaporated on a water-bath in vacuo. The residue is recrystallised from 25 ml. methyl ethyl ketone, and the morphine 3-(morpholinocarbonylmethyl)ether is recovered as a white non-hygroscopic crystalline compound, soluble in water and alcohols, melting at 132–134° C.

*Analysis.*—Calcd. for $C_{23}H_{28}N_2O_5$ (percent): (M.W. =412). C, 66.97; H, 6.84; N, 6.79. Found (percent): C, 66.90; H, 6.74; N, 6.44.

The bases as described in Examples 1 to 4 may, if desired, be converted into salts with any pharmaceutically acceptable mineral or organic acid by any known means of preparation of acid addition salts. These salts are soluble in water.

The compounds of Formula I have valuable pharmacological properties. The strongly oppose the cough-provoking reflex induced in a cat by electrical excitation of the central point of the upper laryngeal nerve when given intravenously or orally. In this test, the active dose is around 0.5 to 2 mg./kg. intravenously and 2 to 10 mg./kg. orally.

They generally have a low toxicity, less than for that of codeine and even in some cases of pholcodine. This is illustrated in the following table.

| Product of Example No.: | $LD_{50}$ (mg./kg.) [1] |
|---|---|
| 1 | 285 (266–305) |
| 2 | 320 (306–334) |
| 3 | 140 (132–148) |
| 4 | 310 (276–347) |
| Codeine | 78 (70–88) |
| Pholcodine | 245 (220–270) |

[1] In the mouse intravenously according to Litchfield and Wilcoxon (95% probability limits).

When administered parenterally or orally, the new compounds have, unlike codeine, no inhibiting effect on the intestinal passage of the mouse. Unexpectedly, their analgesic activity is low compared to that of codeine, whereas the anti-cough activity is intense. This dissociation of effects emphasises the purity of the anti-cough action of the new compounds.

Unlike codeine, the new compounds have no convulsant effects.

In animal tests, it has been impossible to produce with the new compounds symptoms of habituation. This is a marked distinction from morphine.

The new compounds may then be used in the treatment of coughs caused by inflammation of the higher or lower respiratory tract when it is desirable for the patient to reduce or abolish the cough.

Therapeutically, the compounds of Formula I are used either as bases, or as their acid addition salts with pharmaceutically acceptable mineral or organic acids. The salts lend themselves better than the bases to the preparation of liquid medicines, as they are more soluble in water.

The invention accordingly includes within its scope pharmaceutical compositions comprising, in association with a pharmaceutically acceptable carrier or coating, a compound of Formula I or a pharmaceutically acceptable acid addition salt thereof.

The new compositions may be given by mouth as tablets, sugar-coated pills, lozenges, capsules or as solutions or syrups of varying concentrations, rectally as suppositories, or parenterally as sterilised aqueous solutions.

In all these pharmaceutical forms, the unit dose is between 0.001 g. and 0.050 g. and the daily dose is around 0.001 g. to 0.250 g.

The new compounds can also be used in association with other substances with which they are pharmaceutically and therapeutically compatible, for example in association with (A) bronchodilatatory substances such as phenylephrine or ephedrine; with (B) anti-histamine substances, more particularly;

(C) 10(2-dimethylaminoethyl)phenothiazine hydrochloride, chloropheninamine, or 2-(3-dimethylamino-1-p-chlorophenyl-propyl)pyridine; or with analgesic antipyretic substances, such as acetylsalicylic acid, pyrazolones or p-acetylaminophenol; or with combinations of these.

We claim:

1. A compound of the formula

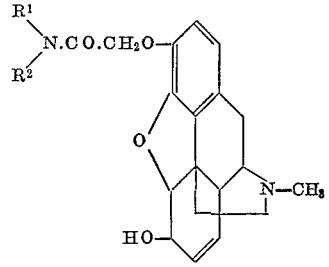

or a pharmaceutically acceptable acid addition salt thereof wherein

is selected from the group consisting of N-methylamino, N,N-dimethylamino, piperidino and morpholino.

2. A compound according to claim 1 which is morphine 3-(N-methylcarbamoylmethyl) ether and its pharmaceutically acceptable acid addition salts.

3. A compound according to claim 1 which is morphine 3-(N,N-dimethylcarbamoylmethyl) ether and its pharmaceutically acceptable acid addition salts.

4. A compound according to claim 1 which is morphine 3-(piperidinocarbonylmethyl) ether and its pharmaceutically acceptable acid addition salts.

5. A compound according to claim 1 which is morphine 3-(morpholinocarbonylmethyl) ether and its pharmaceutically acceptable acid addition salts.

References Cited

Hazard, et al.: "Chemical Abstracts," vol. 52 (1958), col. 10382g.

Kelentei, et al.: "Chemical Abstracts," vol. 53 (1959), col. 4332e.

ALEX MAZEL, Primary Examiner

J. H. TURNIPSEED, Assistant Examiner

U.S. Cl. X.R.

260—285; 424—232, 248, 267